Oct. 21, 1941.　　　　G. B. ROLFE　　　　2,260,234
INSTRUMENT FOR MEASUREMENT OF ELECTRICAL RESISTANCE
Filed May 12, 1941　　　2 Sheets-Sheet 1
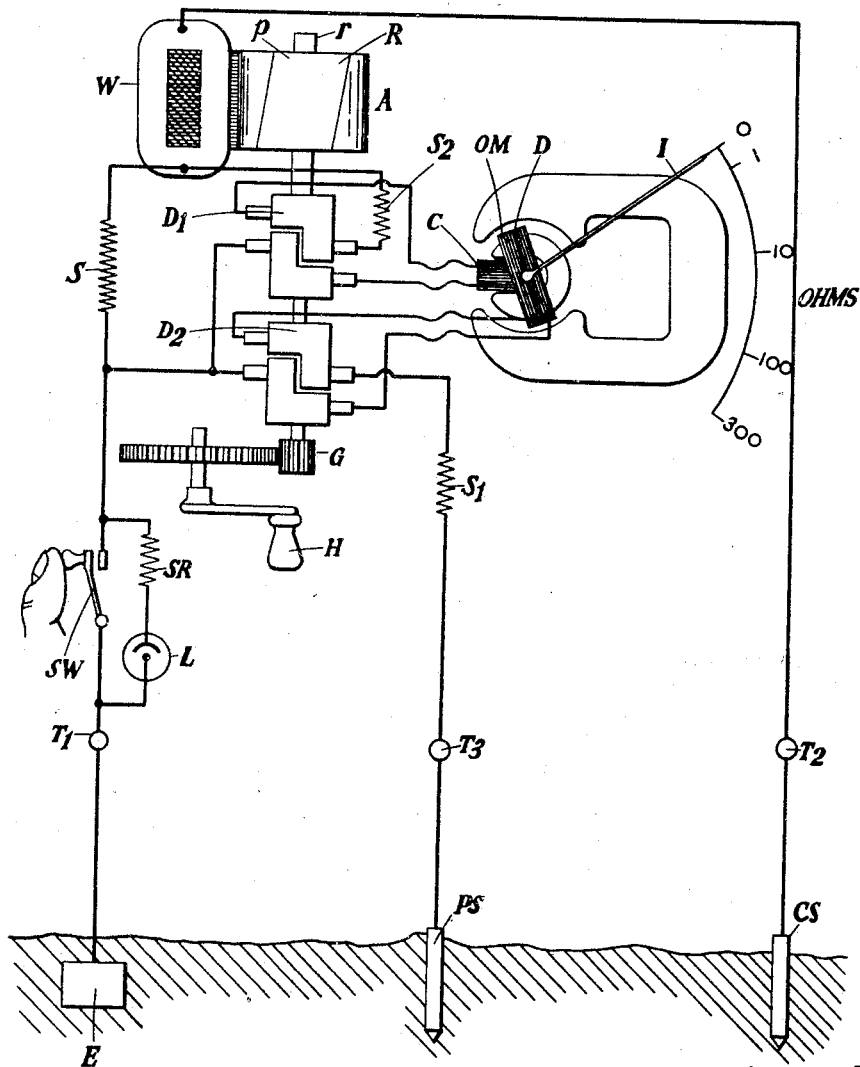

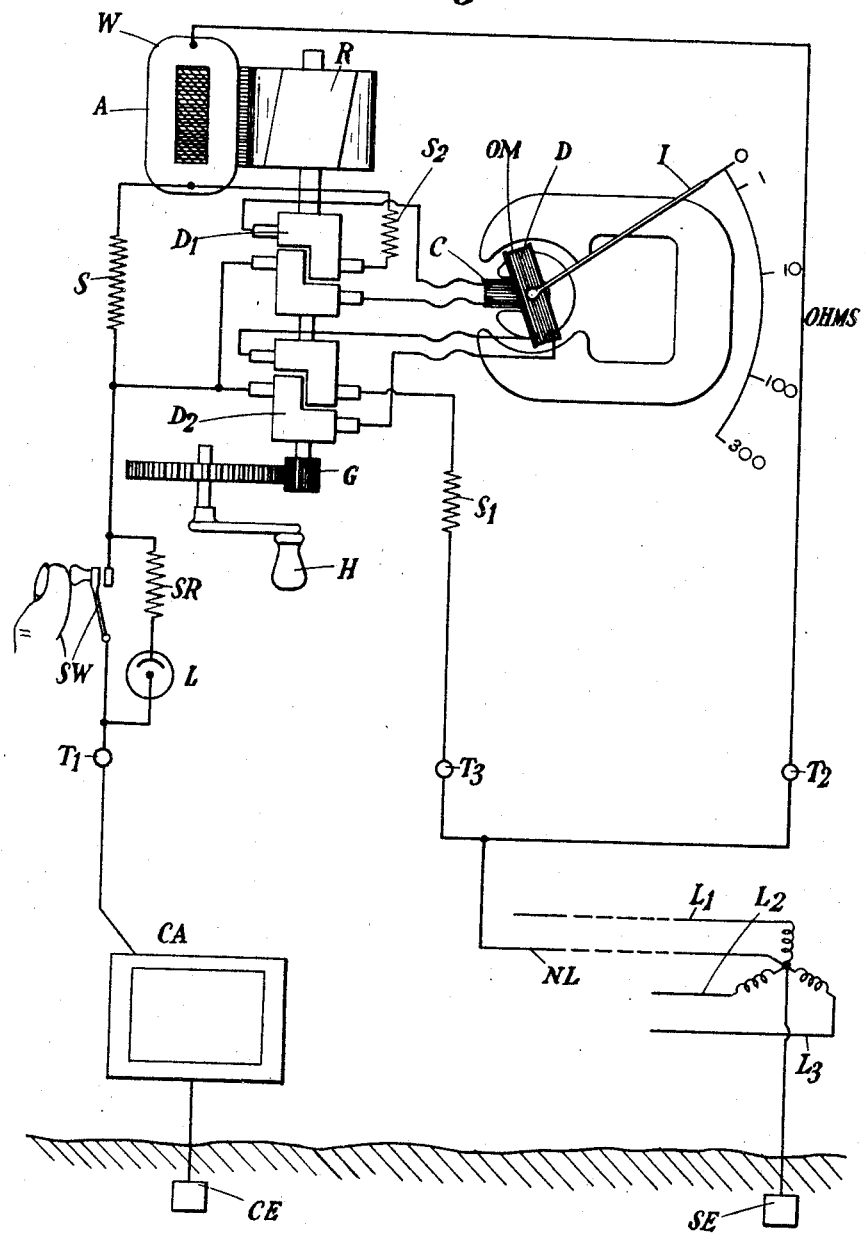

Patented Oct. 21, 1941

2,260,234

UNITED STATES PATENT OFFICE 2,260,234

INSTRUMENT FOR MEASUREMENT OF ELECTRICAL RESISTANCE

George Berkeley Rolfe, Chiswick, London, England, assignor to Evershed & Vignoles Limited, Chiswick, London, England, a British company Application May 12, 1941, Serial No. 393,121
In Great Britain July 27, 1940

7 Claims. (Cl. 175—183)

This invention relates to instruments for the measurement of electrical resistance of the kind in which the measurement is made by causing current to flow through the resistance under test, and comparing the resultant drop in potential across the resistance with the magnitude of the current flowing. The resistance which is the ratio between that drop in potential and the current can be measured by applying the two quantities to the coils of a ratiometer ohmmeter which then indicates directly the ratio between the two quantities and may have its scale graduated directly in ohms.

In the case of some types of resistance, if direct current is used in such a test, the conditions may be disturbed by electrolysis effects in the resistance; this is particularly the case in the measurement of ground resistance and of the resistance of some liquids. However, it has been realized already that this can be largely overcome by applying an alternating current to the resistance under test. Direct currents and potentials may still be applied to the coils of the measuring instrument by the use of rectifiers, and this is often preferable because of the higher sensitivity of direct current forms of measuring instrument. If, however, this is arranged by employing a generator or other source of direct current, and by passing the current to the resistance under test through a continuously actuated reversing switch while employing another reversing switch or commutator for rendering the potential difference across the resistance uni-directional, and then applying it to the measuring instrument, clearly the actual current flowing has to pass through a reversing switch which, as well as the other commutator, may conveniently be driven at the same speed as the generator. However, this involves a fairly substantial construction for the continuously driven reversing switch which handles the testing current and particular care has to be given to the brush contacts.

The main object of the present invention is to devise another form of such apparatus which is somewhat simpler and does not present the above drawbacks and which avoids the use of the commutator and brushes which have to be used with a direct current generator.

Thus, according to the present invention, the instrument comprises an alternating current generator suitable for producing and supplying to the resistance under test the measuring current and a resistor of standard resistance is connected to receive the whole or a given fraction of the current flowing through the resistance to be measured; then, in order to rectify the potential difference across the resistance under test and that across the resistor, a pair of mechanical rectifiers is employed arranged to be driven at synchronous speed with the alternating current generator so that the resulting rectified potentials can be applied to the coils of the ratiometer measuring instrument, in practice usually through swamping resistances. Then the measuring instrument indicates the ratio between the two rectified potentials which is the ratio between the potential difference across the resistance under test and the current flowing in it.

Since it is necessary to apply to the instrument coils uni-directional potentials proportional to the alternating current and the potential difference across the resistance being measured, it might be thought that rectifiers of any type and in fact simple static rectifiers of the surface contact type could be employed. However, in general such static rectifiers are unsuitable for this purpose. This will be appreciated in the case of the measurement of resistance to ground of a ground plate. A ground resistance is not a simple resistance in the same sense as is a length of wire. Moist earth is electrolytic in character, so that the testing current produces back electro-motive forces. Again, stray currents are often present in the soil. In particular, any leakage current to the ground plate from the system to which it is connected will produce its own potential, while other stray currents, such as return currents from electrical railway systems, may also produce unwanted electro-motive forces. For these reasons, electro-motive forces may be set up in the testing circuit, additional to those due to the testing current, and which would therefore give rise to an incorrect reading if rectifiers are provided which constantly rectify any such stray potential differences. The apparatus in accordance with the invention is capable of use for the measurement of the ground resistance of a consumer's installations by measuring the resistance from the casing of his installation through a neutral line which may be the neutral conductor of a polyphase system, or the mid-wire of a three-wire direct current system and then through the main ground at the supply sub-station and through the ground of the consumer's apparatus back to the measuring instrument, so that the current from the testing generator passes through the above circuit and the potential difference across the circuit is applied to the deflecting coil of the measuring instrument. When there is an unsymmetrical load on the system, the potential of the neutral line at the consumer's premises where the test is made will differ from that at the substation and will produce an electro-motive force in the testing circuit additional to that of the source used for testing. Such electro-motive force will also cause incorrect readings if static rectifiers are employed.

If, however, as in accordance with the present invention, synchronously-driven mechanical rectifiers are employed, the error only occurs under certain particular conditions. Assuming that the testing machine is geared to be driven by hand and is rotated steadily at a speed which corresponds to the frequency of the stray electro-motive force, and if the potential generated for the test and the stray potential are in phase, then the maximum high reading error will occur. On the other hand, if the two potentials are opposite in phase, the maximum low reading error will occur, but if the potential differences are in quadrature, the instrument reads correctly. However, in practice it is impossible to maintain any of these conditions when turning by hand, and since the generator can be rotated at such a speed that the two frequencies differ by an amount greater than that which the instrument pointer can follow, the instrument under those conditions steadily indicates the true value of the resistance under test irrespective of any stray potentials in the circuit. It is true that if the generator is turned by hand at a speed very closely approximating to the synchronous speed corresponding to the frequency of the stray electro-motive force, the difference in frequency will be low and cause the pointer of the instrument to waver, but it is then only necessary to rotate the generator rather faster or rather slower for the instrument pointer to take up a steady position accurately indicating the resistance being measured.

The simplicity of the apparatus necessary may be easily explained by the following description of an example of the instrument in accordance with the invention, reference being had to the annexed drawings, in which:

Figure 1 diagrammatically illustrates the components of the instrument and the internal connections with the external connections necessary for measurement of ground resistance;

Figure 2 shows diagrammatically the construction of the simple generator used; and Figure 3 is a diagram similar to Figure 1 for measuring the resistance of the complete ground circuit of a consumer's installation.

The apparatus used consists of an alternating current generator A which, in the example illustrated, is of the simplest kind having a rotor R driven at high speed and connected by step-up gearing G to a crank handle H. The rotor R consists of a two-pole permanent magnet, the armature A being stationary and the armature winding W being wound on the magnetic circuit whose flux is varied as the rotating magnet R passes the pole-pieces $P_1$, $P_2$, as best seen in Figure 2.

In the ordinary way, a plain two-pole magnet is likely to exhibit a tendency to stick in the positions in which the flux linkage is a maximum, a tendency sometimes referred to as "cogging." In order to avoid or reduce this, as shown in the drawings, the two-pole magnet R is shaped so that it has a skew form, that is to say, the polar faces $p$, as shown in the drawings, in passing from one end of the rotor R to the other are progressively inclined at a greater angle to those of the end section. In such a construction, when an end section of the magnet is fully linked with the pole-pieces $P_1$, $P_2$ of the stator, other cross-sections of the magnet have not yet reached that position. In this machine the two-pole magnet constitutes the only rotating member, and no sliding or slip-ring connections are necessary since the alternating current generated is taken off from the terminals of the winding W.

Two rectifiers $D_1$, $D_2$ are mounted on the rotor spindle $r$ and are so driven at the same speed as the rotor, and as seen in Figure 1, they are of the usual general construction of small commutators with brushes. The instrument also includes an ohmmeter movement OM of the ratiometer or crossed-coil type with a control coil C and a deflecting coil D. A resistor S of standard resistance is connected between one terminal of the alternator winding W and a terminal $T_1$ of the instrument. The other terminal of the alternator winding W is connected to a second terminal $T_2$ of the instrument, while the third terminal $T_3$ is connected through a swamping resistor $S_1$ to the commutator $D_2$, while a second swamping resistor $S_2$ is connected between the commutator $D_1$ and the end of the standard resistance S connected to the alternator winding W.

The instrument is shown connected in Figure 1 for effecting a measurement of ground resistance at a ground plate E to which the terminal $T_1$ is directly connected. The terminal $T_2$ is connected directly to a current spike CS inserted into the ground and the terminal $T_3$ to a potential spike PS inserted in the ground between the plate E and the current spike CS. In order to carry out the test, the rotor R is steadily rotated by the handle H until the pointer I takes up a steady reading. Current is supplied from the alternator winding W to the current spike CS, flows through the ground and the resistance at the plate E, through the resistor S, back to the alternator winding W. A potential proportional to the current flowing is taken off from the terminals of the resistor S to the commutator $D_1$ through the swamping resistor $S_2$, the rectified output being applied to the control coil C. The potential difference between the ground plate E and the potential spike PS is taken through the swamping resistor $S_1$ to the commutator $D_2$, and the rectified output from this commutator is supplied to the deflecting coil D. The deflection of the pointer I, which can be read directly in ohms, is therefore a measure of the ratio between the potential difference between the ground plate E and potential spike PS and the potential difference across the standard resistance S which, of course, is proportional to the current flowing, and therefore is a measure of the resistance at the ground plate E.

In order to facilitate the carrying out of the measurement of ground resistance of a consumer's apparatus in which the instrument is connected to a neutral line as mentioned above, the instrument is provided with a live wire detector which consists of an indicating lamp L in series with a safety resistor SR arranged to be short-circuited by a normally open manually-operated switch SW. The connections for this form of test are shown in Figure 3 where the terminals $T_1$, $T_2$ are directly connected together and are intended to be connected to the neutral line NL. The terminal $T_1$ is connected directly to the grounded casing of the consumer's apparatus CA, the resistance of whose ground connection is to be measured. It is possible through accident to make the connection from the terminals T2, T3 to one of the live wires L1, L2, L3 and, without some precaution, this might result in serious damage to the ohmmeter OM. It is for this reason that the lamp L is connected in the circuit since if a wrong connection is made, this lamp will glow, whereas if the connection is properly made to the neutral line NL, it does not receive a substantial current, whereupon the switch SW can be safely closed for making the test. In this case, it can be seen that current flows from the alternator winding W to the terminals T2, T3, along the neutral line into the main ground SE at the sub-station through the ground to the consumer's ground connection CE, through his apparatus CA to terminal T1 and hence through the resistor S, back to the alternator winding W. The potential across the standard resistance S is rectified by the commutator D1 and applied to the control coil C, as already explained. The potential difference between the terminal T1 and the common terminals T2, T3, is rectified by the commutator D2, the output of which is applied to the deflecting coil D. The pointer O therefore indicates the sum of the resistances of the consumer's ground connection and the station ground connection, together with the resistance of the general body of ground between them and the neutral line. As the latter resistances are either negligible or of known value, the effectiveness of the consumer's ground is at once indicated.

I claim:

1. An instrument for the measurement of electrical resistance comprising, an alternating current generator for providing testing current to flow in the resistance under test, a resistor of standard resistance connected to said generator to receive a current proportional to the testing current, a ratiometer measuring instrument, a pair of mechanical rectifiers operatively connected to be driven in step with said generator, connections for applying respectively the potential across the resistance under test, and the potential across said resistor to said rectifiers, and connections for applying the rectified potentials from said rectifiers to the coils of said ratiometer measuring instrument.

2. An instrument for the measurement of electrical resistance comprising, a hand-driven alternating current generator for providing testing current to flow in the resistance under test, a resistor of standard resistance connected to said generator to receive a current proportional to the testing current, a ratiometer measuring instrument, a pair of mechanical rectifiers having rotary elements mounted on the shaft of said generator, connections for applying respectively the potential across the resistance under test, and the potential across said resistor to said rectifiers, and connections for applying the rectified potentials from said rectifiers to the coils of said ratiometer measuring instrument.

3. An instrument for the measurement of electrical resistance comprising, an alternating current generator for providing testing current to flow in the resistance under test, a crank handle for said generator, toothed gearing connecting said crank handle to the rotor of said generator, a resistor of standard resistance connected to said generator to receive a current proportional to the testing current, a ratiometer measuring instrument, a pair of mechanical rectifiers having rotary elements mounted on the shaft of said generator, connections for applying respectively the potential across the resistance under test, and the potential across said resistor to said rectifiers, and connections for applying the rectified potentials from said rectifiers to the coils of said ratiometer measuring instrument.

4. An instrument for the measurement of electrical resistance comprising, an alternating current generator for providing testing current to flow in the resistance under test, said generator comprising a bi-polar permanent magnet mounted for rotation and a stationary armature winding, a resistor of standard resistance connected in series with said armature winding, a ratiometer measuring instrument, a pair of mechanical rectifiers operatively connected to be driven in step with said generator, connections for applying respectively the potential across the resistance under test, and the potential across said resistor to said rectifiers, and connections for applying the rectified potentials from said rectifiers to the coils of said ratiometer measuring instrument.

5. An instrument for the measurement of electrical resistance comprising, an alternating current generator for providing testing current to flow in the resistance under test, a resistor of standard resistance connected to said generator to receive a current proportional to the testing current, a high resistance detector connected in series with the armature of said generator, a normally-open switch connected across said detector, a ratiometer measuring instrument, a pair of mechanical rectifiers operatively connected to be driven in step with said generator, connections for applying respectively the potential across the resistance under test, and the potential across said resistor to said rectifiers, and connections for applying the rectified potentials from said rectifiers to the coils of said ratiometer measuring instrument.

6. An instrument for the measurement of electrical resistance comprising, an alternating current generator for providing testing current to flow in the resistance under test, a resistor of standard resistance connected in series with the armature of said generator, terminals for connection to the resistance being measured, a ratiometer or crossed-coil measuring instrument, a pair of mechanical rectifiers each comprising commutator segments mounted on the shaft of said generator and co-operating brushes, connections for connecting respectively said terminals and the ends of said resistor to the input brushes of said rectifiers, and connections for connecting the output brushes of said rectifiers respectively to the coils of said measuring instrument.

7. An instrument as claimed in claim 4, in which the permanent magnet of the generator is of skew form with the boundaries of its polar faces inclined to the axis of rotation.

GEORGE BERKELEY ROLFE.